(12) United States Patent
Jaynes et al.

(10) Patent No.: US 6,494,304 B1
(45) Date of Patent: Dec. 17, 2002

(54) PRODUCTION OPERATION WITH POWER AND FREE PALLET CONVEYOR

(75) Inventors: John Jaynes, Commerce; Melvin Edwards, Livonia; Kelsey Schell, Brighton, all of MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 4 days.

(21) Appl. No.: 09/639,003

(22) Filed: Aug. 15, 2000

(51) Int. Cl.⁷ .............................................. B65G 15/64
(52) U.S. Cl. .................................. 198/345.2; 104/172.1
(58) Field of Search ........................ 198/345.2, 347.1, 198/345.1, 465.1, 781, 465.4, 747; 104/172.1, 162, 172.4

(56) References Cited

U.S. PATENT DOCUMENTS

| | | | |
|---|---|---|---|
| 2,634,851 A | * | 4/1953 | Steinhoff |
| 2,816,643 A | * | 12/1957 | Klamp |
| 2,844,241 A | * | 7/1958 | King |
| 2,883,942 A | * | 4/1959 | Johnson |
| 3,511,187 A | * | 5/1970 | Hanna |
| 3,518,946 A | * | 7/1970 | Kavieff |
| 3,707,923 A | * | 1/1973 | Woodling |
| 3,948,186 A | * | 4/1976 | McCaul ................ 104/172 S |
| 4,548,135 A | * | 10/1985 | Kupczyk |
| 4,564,100 A | * | 1/1986 | Moon |
| 4,616,570 A | * | 10/1986 | Dehne |
| 4,669,388 A | | 6/1987 | Dehne et al. |
| 4,745,865 A | | 5/1988 | Dehne |
| 4,771,697 A | | 9/1988 | Dehne |
| 4,924,777 A | | 5/1990 | Linton et al. |
| 4,947,978 A | | 8/1990 | Rhodes |
| 5,012,917 A | | 5/1991 | Gilbert et al. |
| 5,195,630 A | | 3/1993 | Donovan et al. |
| 5,318,167 A | | 6/1994 | Bronson et al. |
| 5,517,922 A | | 5/1996 | Summa et al. |
| 5,556,466 A | | 9/1996 | Martin et al. |
| 5,577,593 A | | 11/1996 | Hooper |
| 5,669,309 A | * | 9/1997 | Carlton et al. .............. 104/162 |

* cited by examiner

Primary Examiner—Kenneth W. Noland
(74) Attorney, Agent, or Firm—Dickinson Wright PLLC

(57) ABSTRACT

The present invention is directed to a pallet conveyor system that includes a pallet assembly having a pallet and a workpiece coupled to the pallet, a production area where a production task is performed on the workpiece, and a delivery area wherein the pallet assembly is moved to or from the first production area. The pallet conveyor system also includes a first conveyor assembly to drive the pallet assembly through the first production area and a chain conveyor assembly to drive the pallet assembly through the first delivery area. The first conveyor assembly operably engages the pallet in the first production area but not in the delivery area. Conversely, the chain conveyor assembly drivably engages the pallet assembly in the delivery area but not in the production area.

44 Claims, 12 Drawing Sheets

PRODUCTION OPERATION WITH POWER AND FREE PALLET CONVEYOR

BACKGROUND OF THE INVENTION

1. Technical Field

The present invention relates to a pallet conveyor system and, more particularly, to a conveyor system that includes a conveyor to transport the pallets through vertical and horizontal curves.

2. Background

Manufacturing facilities, particularly automobile assembly plants in Europe, have for some time used moving pallets or skillets to convey large parts, such as vehicle bodies, throughout the facility. The pallets are commonly larger than the workpiece so as to permit a worker to ride the pallet along with the workpiece and to perform a production task as the pallet passes through a production area. When the referenced production task is complete for a pallet, the pallet moves through a delivery area and then to the next production area.

Many such facilities include multiple production areas on different levels. Accordingly, each pallet assembly, which includes the workpiece and pallet, is moved from production area to production area until all of the assembly steps are completed. The production areas within a facility are commonly separated from one another by delivery areas that are strategically positioned and configured within the overall system layout so as to provide readily accessible part storage, walkways, and other effective use of floor space.

In existing pallet conveyor systems, elevators are used to move the pallet assembly between floors, turntables rotate the pallet assembly, roll tables translate the pallet assembly along a linear path, and cross transfer tables move the pallet assembly along a perpendicular path. Moreover, various indexing stations, accelerators, and decelerators are used to provide proper pallet spacing in the production and delivery areas. These components are commonly intermixed with one another and combined with control systems to move the pallet assemblies between and through production areas located throughout the facility.

An exemplary layout might include first and second production areas oriented parallel to one another on a lower level of the building. The pallet assemblies are conveyed in a first direction through the first production area, raised to the second floor, moved into alignment with the second production area, lowered to the first floor, and then conveyed through the second production area in a direction opposite to that used in the first production area. A conventional conveyor system for such a layout would require friction drive assemblies at the end of the first production area to convey each pallet assembly to an elevator. The elevator would then raise the pallet and workpiece to the upper level of the building where an accelerating friction drive would move the pallet onto a roll table. The roll table then would convey the pallet to a cross transfer where the pallet is aligned with another elevator. An accelerator drive would then move the pallet into a second elevator for lowering the pallet to the lower level in alignment with the second production area. Another undocking drive would then move the pallet off of the second elevator and into the second production area.

While many of the elevators, transfer tables, roll tables, and turn tables may seem excessive if the only consideration were to move the pallet assemblies from one production area to the next along the shortest distance, important operational criteria such as the convenient storage of parts for the workers, maintaining walkways between and adjacent the production areas, and providing delivery areas where the pallet assemblies can be accumulated and/or indexed impact the overall pallet system layout. For example, indexing within delivery areas ensure the proper separation between pallets as they enter the next production area and provide for accumulation of pallets known as float. Sufficient float before a production area prevents the production area from having to immediately shut down due to lack of product should the preceding production area stop momentarily. Moreover, indexing may also be used in stations where the workpiece must be stationary in order to properly perform the production task.

Each of the above system components require drive, safety, and control units to ensure proper delivery of each pallet assembly to and through the respective production areas. Accelerating drives move the pallet assemblies into and out of the elevators and establish proper spacing between adjacent pallets in delivery areas. Docking drives ensure proper abutment of the pallets in the production areas. Finally, transfer tables, turntables, elevators, and friction drive assemblies move the pallets along, or change their orientation relative to, the path of movement. Each of the above components, and their associated controls, significantly impact the overall cost, complexity, and floor space requirements of conventional pallet conveyor systems.

As is described in greater detail below, the present invention eliminates many of the conveyor system components discussed above through the integrated use of a second conveyor system, preferably an inverted power and free conveyor. While some existing references do contemplate the use of a chain conveyor in combination with a conventional pallet conveyor, these references do not recognize the overall benefits attendant to the present invention nor the structure described and claimed herein. For example, U.S. Pat. No. 4,564,100 issued Jan. 14, 1986 to Moon, entitled "Carrier Conveyor System," as well as U.S. Pat. No. 5,556,466 issued Sep. 17, 1996 to Martin et al., entitled "Coating Plant," each relate to the use of a chain conveyor to deliver a pallet to a work area. However, these references do not disclose the specific features of the present invention nor the benefits thereof including, without limitation, using the chain conveyor to transport a pallet through vertical and horizontal curves, using the chain conveyor to deliver pallets into a work area wherein the pallets are placed in abutting engagement with one another, using an inverted power and free conveyor to move the pallets through delivery areas, the configuration of the transfer zone of the present invention, the extension of the free tracks in the power and free conveyor through the work area, and numerous other benefits such as those described below.

Finally, a particular feature of the present invention is the use of off-set and generally parallel free tracks within the production area in order to off-set the drive trolley from the load trolleys permitting the pallet assemblies to be moved from spaced engagement relative to one another in the delivery areas to abutting engagement in the production areas. While chain driven conveyor systems commonly include off-set and parallel free tracks in accumulation or bias areas, such conventional arrangements are not used to separate the drive trolley from the remaining load trolleys or otherwise takeup pallet spacings as the pallets enter production areas.

SUMMARY OF THE INVENTION

In view of the above, a need exists for a production operation that includes a chain conveyor system to effectively move pallets between production areas thereby providing cost savings over prior art systems and maximizing effective use of floor space.

Accordingly, an object of the invention is to include a chain conveyor that drives the pallet assemblies through delivery areas and a friction drive assembly that drives the pallet assemblies through production areas.

Another object of the present invention is to maintain the pallet assemblies spaced from one another in the delivery areas to permit the pallets to move more easily through vertical curves and horizontal turns and in abutting engagement with one another in the production areas.

A further object of the present invention is to provide a transfer zone where the pallets are moved from driving engagement with the chain conveyor and into driving engagement with the friction drive assembly. The transfer zone also moves the pallet assemblies between a spaced relationship relative to one another and abutting engagement.

A still further object of the present invention is to split the common free track of the chain conveyor system in the delivery area to offset drive trolley free and load trolley free tracks in the production area so as to permit the pallet assemblies to move from their spaced relationship in the delivery area to abutting engagement in the production areas.

Still another object of the present invention is to provide a pallet assembly with greater stability by including a yoke having rollers that engage the underside of the pallet assembly.

Yet another object of the present invention is to provide multiple sets of guide rails on the underside of the pallet and positioned to rollingly engage the rollers on the yoke to permit the pallet to be conveyed through a delivery area in a biased orientation.

In order to achieve the above advantages, the additional advantages discussed herein, and other advantages attendant to the improvement, the present invention is directed to a pallet conveyor system that includes a pallet assembly having a pallet and a workpiece coupled to the pallet, a production area where a production task is performed on the workpiece, and a delivery area wherein the pallet assembly is moved to or from the first production area. The pallet conveyor system also includes a first conveyor assembly to drive the pallet assembly through the first production area and a chain conveyor assembly to drive the pallet assembly through the first delivery area. The first conveyor assembly operably engages the pallet in the first production area but not in the delivery area. Conversely, the chain conveyor assembly drivably engages the pallet assembly in the delivery area but not in the production area. The present invention also includes a conveyor driven production operation which generally incorporates the above described pallet conveyor system as well as a method of moving a plurality of pallet assemblies through a production area.

The method relates to a method of moving a plurality of pallet assemblies through a production area wherein each of the plurality of pallet assemblies include a pallet and a workpiece coupled to each pallet. The production operation includes a first area and a delivery area wherein each pallet assembly is moved to or from the first area. The production operation also includes a first conveyor assembly drivably engaging the plurality of pallet assemblies in the first area and a power and free conveyor assembly drivably engaging the pallet assemblies in the delivery area. The power and free conveyor assembly includes a power track and a free track. The free track includes a common free track in the delivery area and a drive trolley free track offset from and generally parallel to a load trolley free track in the first area. The method includes the steps of maintaining the plurality of pallet assemblies spaced from one another in the delivery area and abutting adjacent pallet assemblies in the first area.

Further scope of applicability of the present invention will become apparent from the following detailed description, claims, and drawings. However, it should be understood that the detailed description and the specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description, the appended claims, and the accompanying drawings in which:

DETAILED DESCRIPTION OF THE PREFERRED EMBODIMENT

Figure 1:
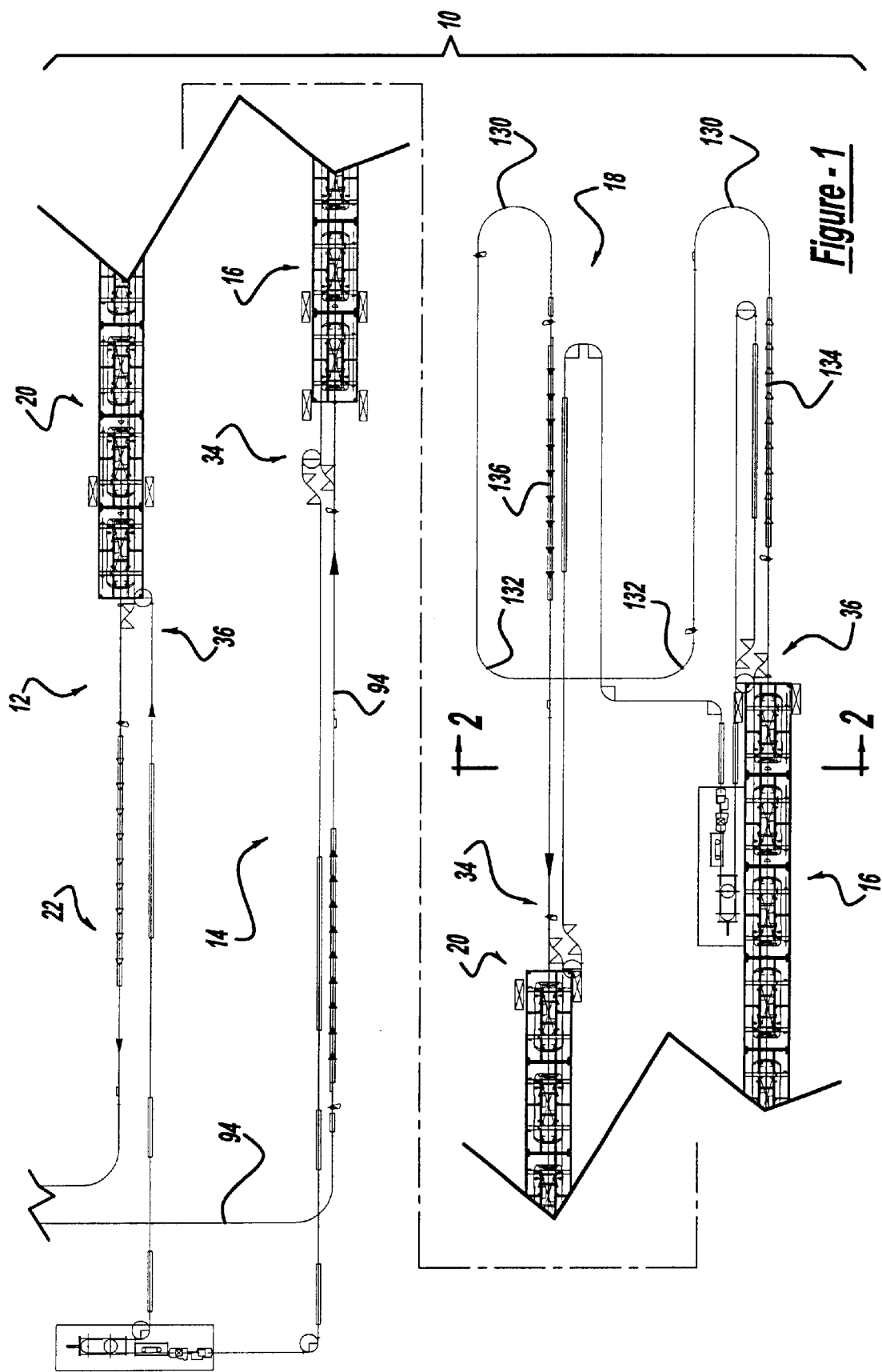
FIG. 1 is a top plan view of a production operation according to the present invention.

A pallet conveyor system according to the present invention will now be described with reference to FIGS. 1–12 which illustrate a production operation 10 that includes a plurality of production areas and delivery areas. It should be appreciated that the production operation illustrated in the attached figures is provided for exemplary purposes only and that the pallet conveyor system of the present invention may be used in a variety of system layouts.

The illustrated production operation 10 includes a pallet conveyor system 12 that conveys a plurality of pallet assemblies into and through the production operation. More particularly, the pallet conveyor system 12 sequentially moves each pallet assembly through a first delivery area 14, a first production area 16, a second delivery area 18, a second production area 20, and a third delivery area 22. The pallet conveyor system 12 preferably includes a power and free conveyor assembly 30 (FIG. 2) for driving the pallets in each of the delivery areas and a friction drive assembly 32 (FIG. 4) that moves the pallet assemblies through each of the production areas. As is described in greater detail below, the pallet assemblies are spaced from one another in the delivery areas and in abutting engagement with one another in the production areas. By using separate drive assemblies in the delivery and production areas, and particularly the power and free conveyor assembly 30 in the delivery areas, the present invention achieves significant cost and floor space savings when compared to pallet conveyor systems previously used in the art. Additionally, by driving the pallet assemblies in the delivery areas with the power and free (PF) conveyor assembly 30, the present invention capitalizes on the greater efficiencies and operational advantages provided by the PF system. For example, PF conveyors can effectively accumulate pallet assemblies in bias banks between production areas and index the pallet assemblies within a production area when a stationary workpiece is desired for the production task.

In order to effectively integrate the PF conveyor assembly 30 with the friction drive assembly 32, the pallet conveyor system 12 includes entrance and exit transfer zones 34 and 36. The entrance transfer zone 34 transfers the pallet assemblies from being driven by the PF conveyor assembly 30 to driving engagement with the friction drive assembly 32. During the transfer, the spacing between adjacent pallet assemblies, which is maintained by the PF conveyor assembly, is taken up such that the pallet assemblies are in abutting engagement as they are conveyed through the production areas. In order to achieve efficient operation of the overall system, the pallet assemblies must be smoothly transferred between the conveyor assemblies in the production areas and driving engagement with the PF conveyor assembly in the delivery areas. As will be described in greater detail hereinafter, the efficient transfer is provided in the described embodiment by disengaging the PF power chain from driving engagement with each pallet prior to the pallet assemblies engaging the first drive of the friction drive assembly 32. While the power chain and the power track of the PF conveyor assembly are disengaged from the pallet assemblies, the common free track in the transfer area is split into generally parallel and offset drive trolley and load trolley free tracks which are extended through the production areas. Then, in the exit transfer zone 36, the offset drive and load trolley free tracks are merged into the common free track so as to reposition the drive trolley for engagement by the power chain which moves the pallet assembly through the next delivery area.

Figure 2:
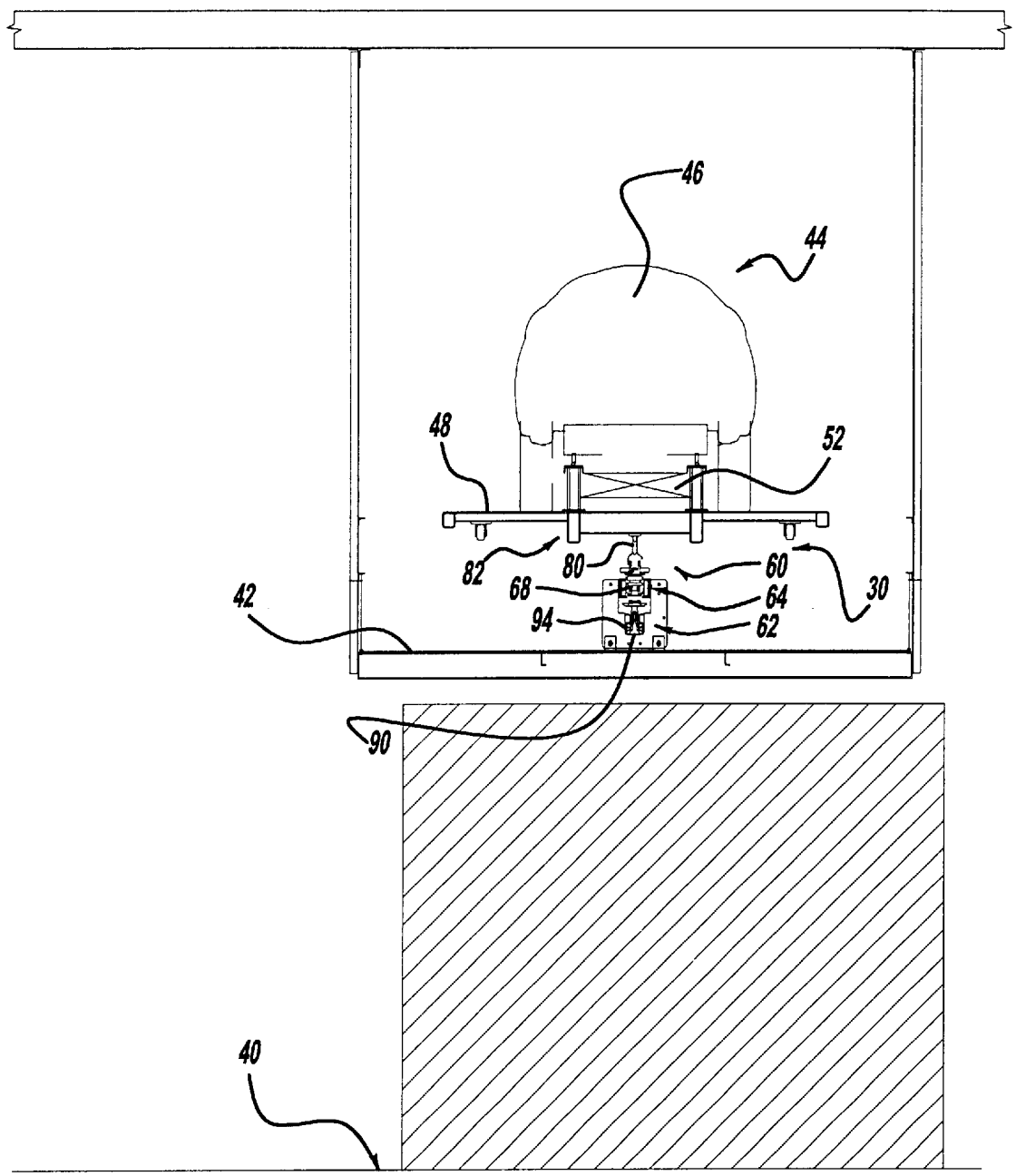
FIG. 2 is a sectional view taken along the line 2—2 shown in FIG. 1 and illustrating a representative view of the multiple building floors in a delivery area.

As is best illustrated in FIG. 2, the illustrated embodiment of the production operation 10 spans a lower level 40 and an upper level 42. Those skilled in the art will appreciate from this description and the appended drawings and claims that the benefits of the pallet conveyor system 12 of the present invention may also be realized in single level applications as well as applications of more than two levels.

The production operation 10 includes a pallet assembly 44 having a workpiece 46 resting on, supported by, or otherwise coupled to a generally rectangular and flat pallet 48. While the general configuration and dimensions of the pallet may be varied to suit the particular application, the pallet preferably has plan dimensions greater than that of the workpiece so as to provide an open peripheral area around the workpiece. A worker 50 (FIG. 5) can stand in the open area on the pallet 48 while performing a production task as the pallet assembly 44 is conveyed through a production area. As a further option, a scissor lift 52 may be used to support the workpiece 46 in a manner generally known in the art thereby allowing each worker 50 to raise or lower the workpiece into a position that facilitates performance of the production task.

Figure 8:
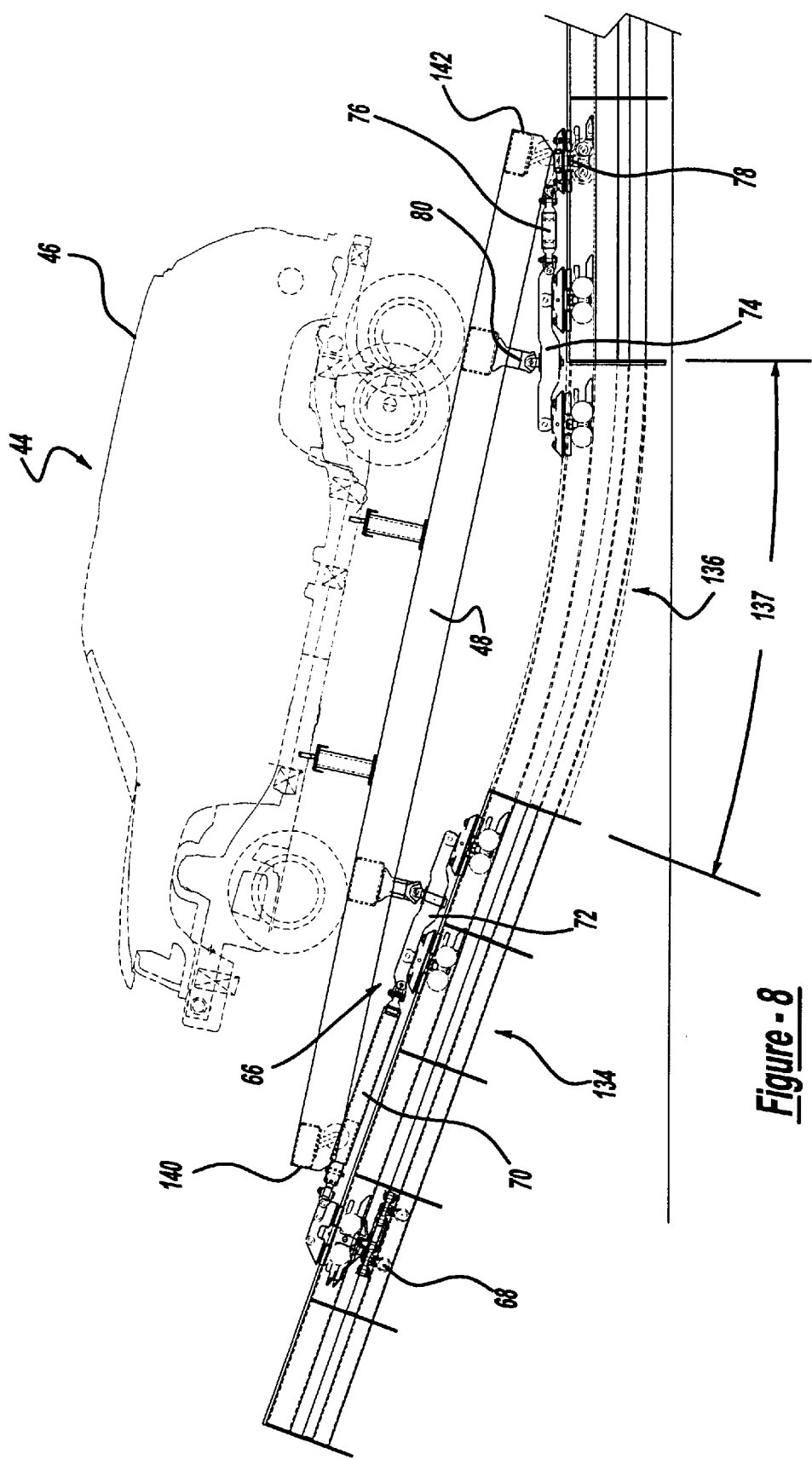
FIG. 8 is a side elevational view of a pallet assembly entering a vertical curve while being driven by the PF conveyor assembly.

The PF conveyor assembly 30 is generally configured in a manner known in the art, such as is described in U.S. Pat. No. 4,616,570, entitled "Power And Free Conveyor Systems" issued Oct. 14, 1986 to Dehne and assigned to the assignee of the present application, the disclosure of which is incorporated herein by reference. While the PF conveyor is illustrated and described herein as an inverted system, it should be appreciated that the invention is equally applicable to an overhead PF conveyor system. The PF conveyor assembly 30 includes a track assembly 60, having a power track assembly 62 and a free track assembly 64 (FIG. 2), and a trolley assembly 66 (FIGS. 4 and 8) that includes a drive trolley 68, a first tow bar 70, first and second load trolleys 72 and 74, respectively, a second tow bar 76, and an accumulating trolley 78. Each of the load trolleys are coupled to the pallet 48 to move with the pallet through the production and delivery areas. The tow bars 70 and 76 pivotally interconnect the drive trolley 68 with the first load trolley 72 (FIG. 8) and the second load trolley 74 with the accumulating trolley 78. In the illustrated embodiment, the first and second load trolleys 72 and 74 are each fixed to the pallet 48 such as by stands 80. The stands are preferably pivotally coupled at their base to each of the respective load trolleys and fixed to the underside of a support frame 82 (FIG. 2) which is in turn fixed to the pallet 48. While the stands 80 may be connected to the load trolleys so as to prevent pivotal movement, the pivotal connection permits rotational movement of the pallet 48 relative to each of the trolleys in a plane parallel to the travel path to facilitate movement of the pallet through vertical curves (FIG. 8). In either configuration, the load trolleys move with the pallet 48 whether the pallet is in the production or delivery areas. However, those skilled in the art will appreciate that the present invention, including the coupling of the trolleys to the pallet, may be modified without departing from the scope of the invention defined by the appended claims.

As noted above, the trolley assembly 66 includes an accumulating free trolley 78 (FIG. 8) coupled to follow the second load trolley 74 by the second tow bar 76. The accumulating free trolley 78 is positioned relative to the pallet 48 such that when pallet assemblies are permitted to accumulate along a free track segment in a manner generally known in the art, the drive trolley of the second pallet engages the accumulating free trolley of the first pallet whereupon the retractable dog of the drive trolley is raised to disengage from the power chain. This disengagement preferably occurs when the front end of the second trolley is spaced from the rear end of the first trolley. While the preferred spacing between accumulated trolleys in the illustrated embodiment is approximately two feet, those skilled in the art should appreciate that the spacing may vary as needed to satisfy the production requirements of the overall system. Moreover, those skilled in the art will appreciate that placing the accumulating free trolley to follow the last load trolley of the preceding pallet permits the first tow bar to be shorter in length then would be required in the absence of an accumulating trolley. The shorter tow bar places the drive trolley closer to the front end of the pallet thereby permitting the pallet assembly to move through tighter vertical curves as is described below with reference to FIG. 8.

The drive trolley 68 is preferably a DOG MAGIC® trolley such as that manufactured by Jervis B. Webb Company of Farmington Hills, Mich., the assignee of the present invention, and includes a retractable dog for selectively engaging the power chain of the PF conveyor. The power track assembly 62 includes a power track 90 (FIGS. 2 and 6) defining a channel 92 and an endless power chain 94 that is movable within the channel. Pusher dogs 96 are fixed to the power chain 94 and extend vertically upward to engage the retractable dog on the front drive trolley 68.

Figure 3:
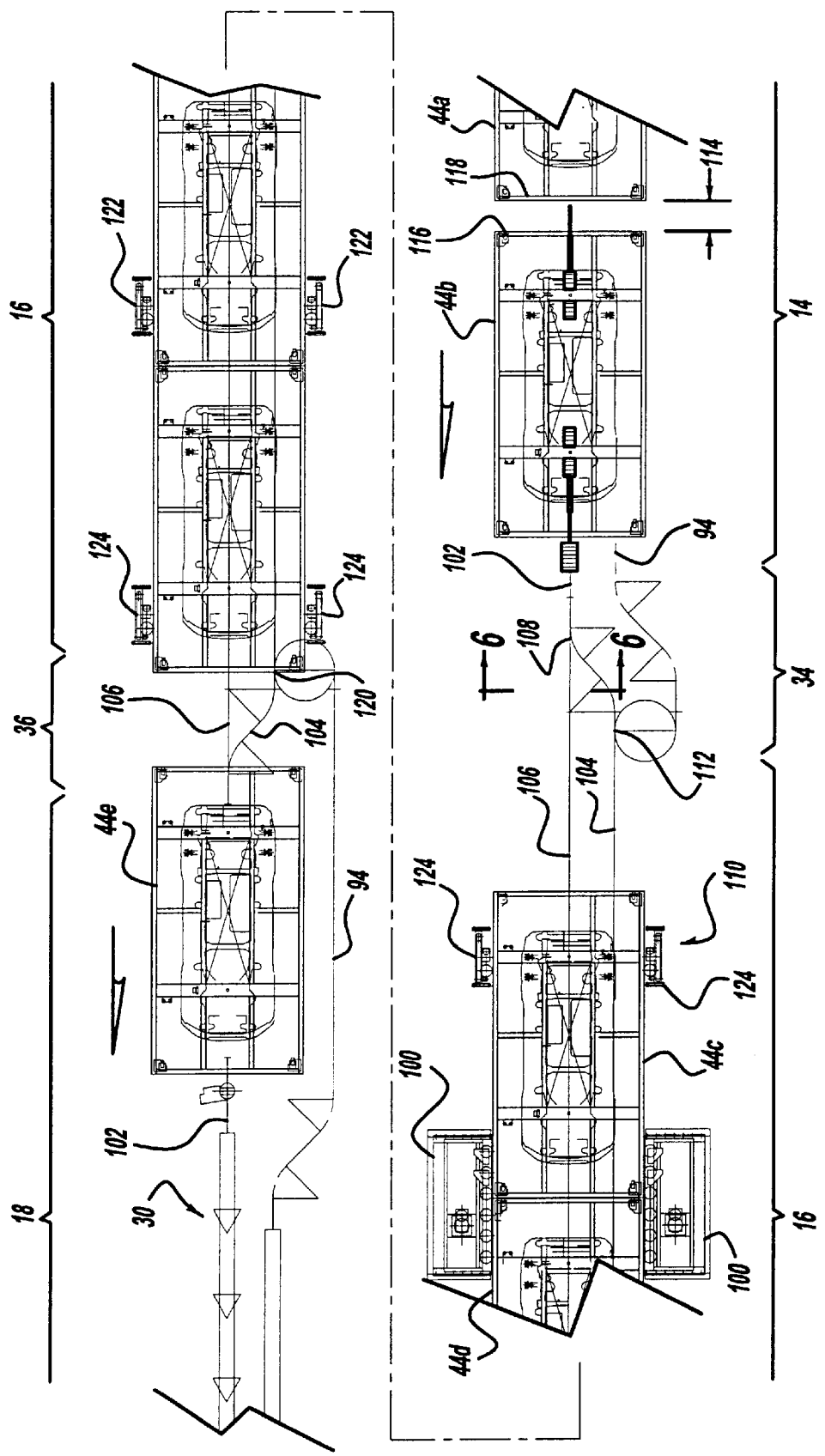
FIG. 3 is a top plan view of the entrance and exit transfer zones, delivery areas, and a production area.

As noted above, each pallet assembly 44 is transferred between driving engagement with the PF conveyor assembly 30 and driving engagement with the friction drive assembly 32 within an entrance or exit transfer zone 34 and 36, respectively (FIG. 3). The PF conveyor assembly 30, friction drive assembly 32, and transfer zones 34 and 36 are configured to move the pallet assemblies from spaced relation in the delivery areas to abutting engagement in the production areas. While a variety of conventional friction drive assemblies may be used within the production area, the drive assembly preferably includes drive wheels that frictionally engage the sides of the pallets to effectively abut adjacent pallets and smoothly moving the pallet train through the production area.

Figure 4:
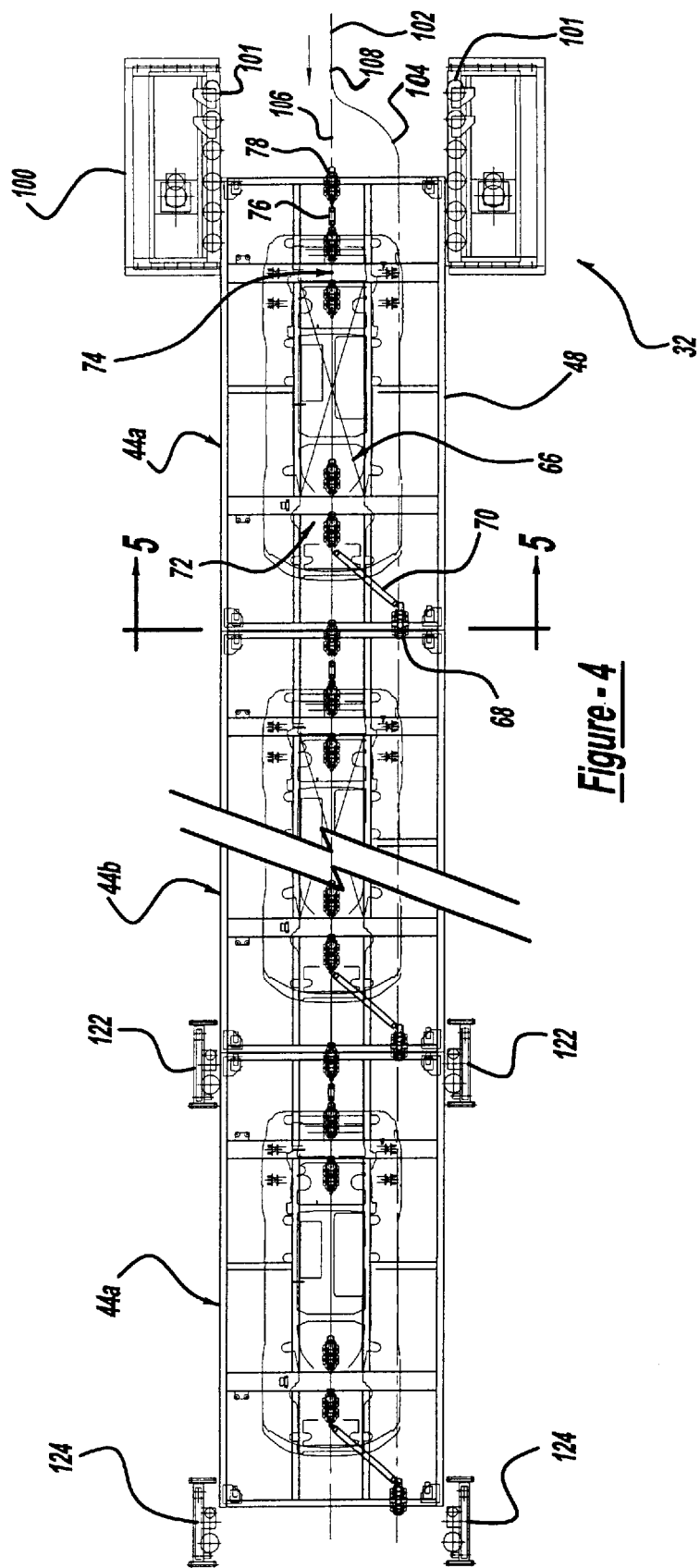
FIG. 4 is a top plan view of a production area according to the present invention.
Figure 5:
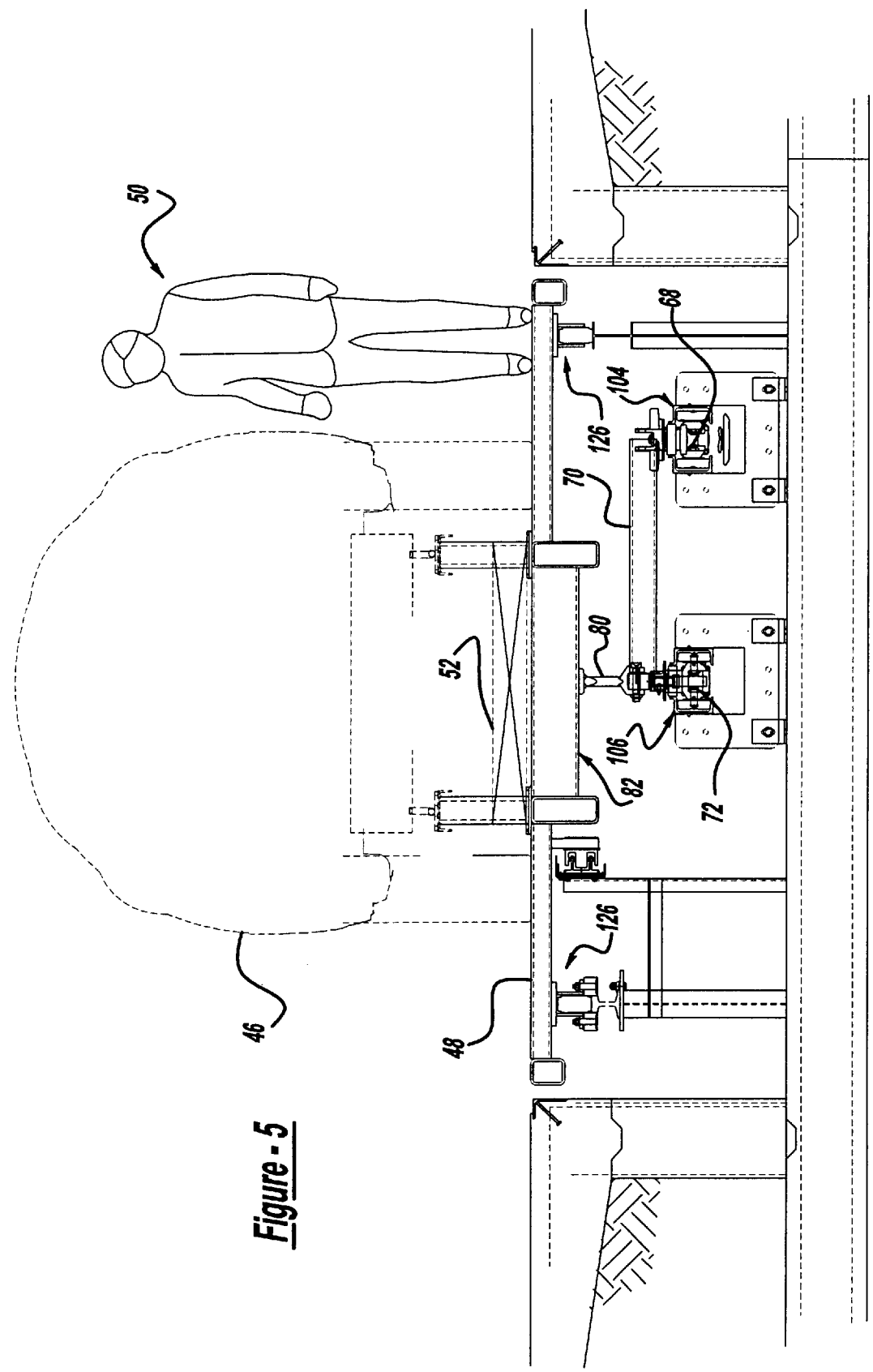
FIG. 5 is a cross-sectional view in the transfer zone taken along the line 5—5 shown in FIG. 4.
Figure 7:
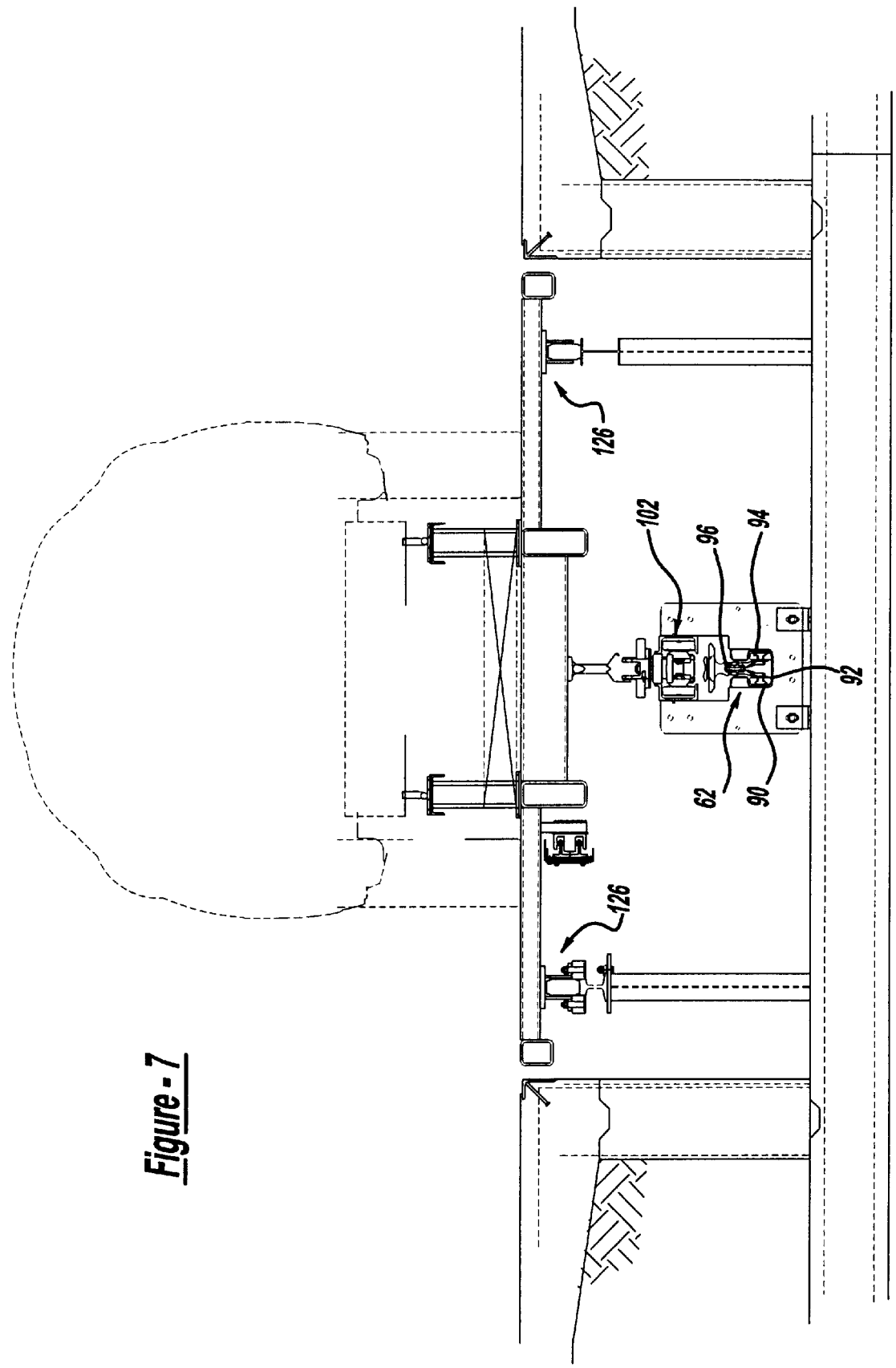
FIG. 7 is a cross-sectional view similar to that shown in FIG. 6 showing an alternative embodiment of the present invention in the transfer zone.

The illustrated friction drive assembly 32 includes a drive wheel assembly 100 (FIG. 4) having driven wheels 101 that are positioned to engage the side of each pallet 48 entering the production area. The driven wheels urge the pallet forward to abut the preceding pallet and push the train of pallets through the production area at a predetermined production speed. FIG. 5 shows a cross-section of the conveyor system within a production area where roller supports 126 preferably bear the entire load of the pallet assembly in order to facilitate smooth movement. However, the PF conveyor assembly 30 may be configured to provide supplemental support for the pallet in a load share arrangement with the spaced roller supports 126. The load sharing arrangement may also be used to support and stabilize the pallet assembly in a delivery area as illustrated in FIG. 7.

The friction drive assembly may include one or several pairs of drive wheel assemblies 100 as needed to satisfy the design loads. Acceptable friction drive assemblies 32, and the drive wheel assembly 100 thereof, are generally known in the art with representative assemblies being installed or available from Dearborn Mid-West Conveyor Co. of Taylor, Mich. However, it should be appreciated that any friction drive assembly, and even drive assemblies that operatively engage the pallets through means other than friction, may be used in the production area without departing from the scope of the invention as defined by the appended claims. The drive assembly in the production area should be capable of maintaining abutting engagement of adjacent pallet assemblies as they are conveyed through the production area and provide an open area to accommodate the drive and load trolleys as they are moved through the production area with the pallet.

With the above general description of the pallet conveyor system 12 in mind, a description of the entrance and exit transfer zones 34 and 36 is now provided with respect to the track configurations in the delivery and production areas. FIG. 3 illustrates a pair of pallet assemblies 44a and 44b that are driven by the PF conveyor assembly 30 through the first delivery area 14 by driving engagement of the drive trolleys 68 with the power chain 94 (FIGS. 2 and 3). In the delivery areas, the free track assembly 64 includes a common free track 102 that is vertically aligned with the power track assembly 62 (FIG. 2). In the delivery areas, the drive trolley and each of the load trolleys of each pallet assembly ride within the common free track 102. However, in the entrance transfer zone 34, the free track assembly 64 is split from the common free track 102 into a drive trolley free track 104 and a load trolley free track 106.

Figure 6:
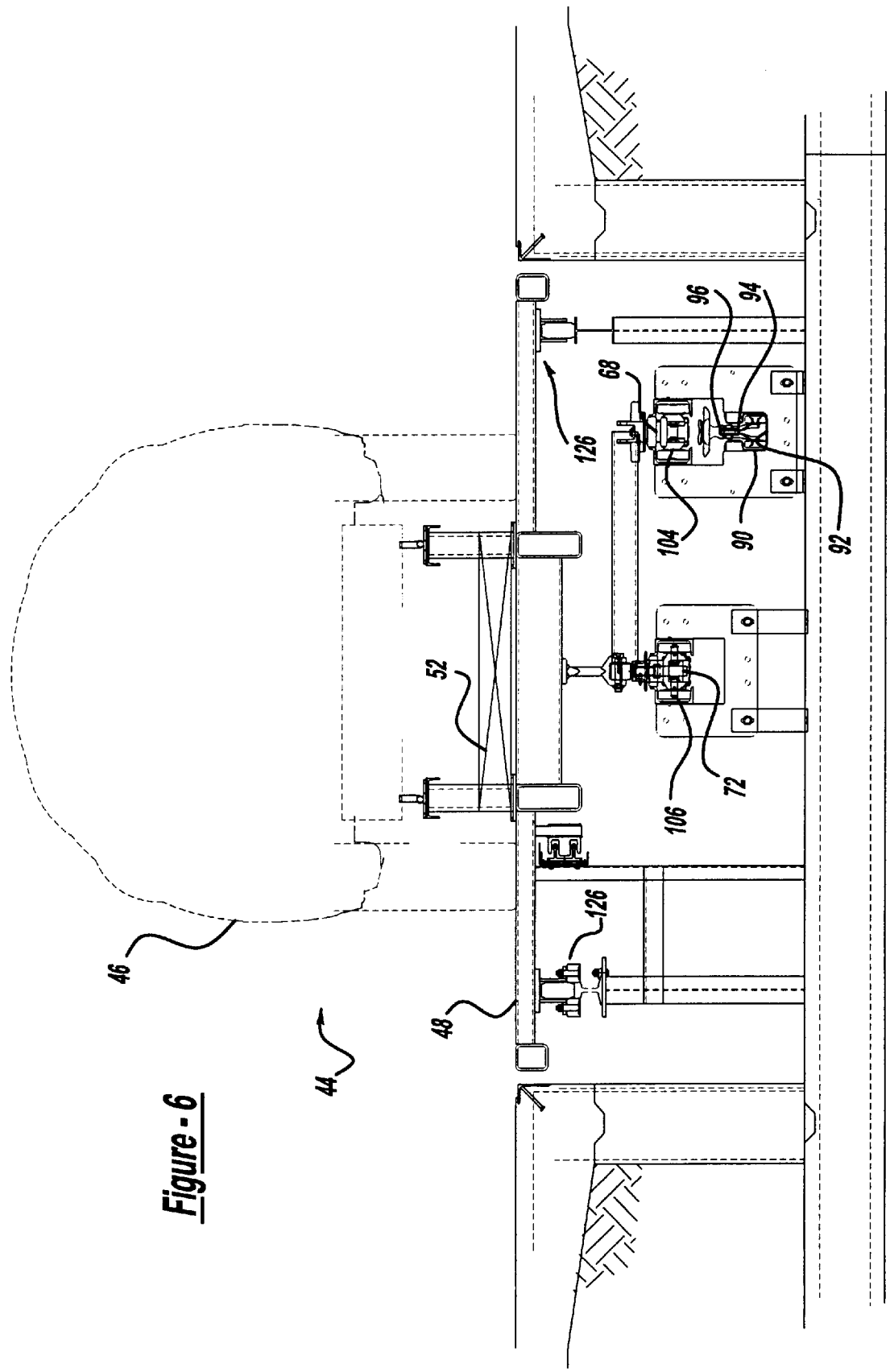
FIG. 6 is a cross-sectional view in the production area taken along the line 6—6 shown in FIG. 3.

The load trolley free track 106 preferably extends co-linearly with the common track 102 while the drive trolley free track 104 diverges into an offset and generally parallel orientation relative to the load trolley free track. A track switch 108 is located at the point of divergence to direct each drive trolley 68 into the drive trolley free track 104. The power track 90 is also diverted in the entrance transfer zone 34 such that the power chain 94 remains vertically aligned with the drive trolley free track 104 to move each drive trolley along the drive trolley free track 104. The switch 108 and its associated controls are further operable to move the switch into a second position to direct the first and second load trolleys 72 and 74 to move from the common track 102 to the load trolley free track 106 (FIG. 6). Switches such as that described above, and the sensors and controllers associated therewith, are generally known in the art and therefore not further described herein.

Entrance transfer zone 34 also includes a close-up mechanism 110, such as an accelerating drive 124 having a clutch or lateral slide mechanism to engage the side of the pallet and accelerate the pallet after disengagement with the power chain. When the accelerated pallet 44c abuts the preceding pallet 44d in the production area, the clutch or slide operatively disengages the accelerating drives 124 from the pallet. The clutch or slide can be reciprocated such that the accelerating drives intermittently engage and disengage the pallet to maintain the abutting engagement of the pallets. The described close-up mechanism 110 is generally known in the art, as are acceptable alternative mechanisms such as air cylinder type pushers. The close-up mechanism 110 is positioned after the point 112 where the power chain 94 is disengaged from the drive trolley 68 so as to prevent the PF conveyor assembly 30 and the friction drive assembly 32 from simultaneously drivably engaging the pallet assemblies. It should be appreciated that proximity sensors and controls capable of ensuring the proper driving sequence are generally known in the art. The close-up mechanism 110 moves each pallet into engagement with the first drive wheel assembly 100 which frictionally drives the pallets at the predetermined production speed through the production area.

In the first production area 16, the drive trolley 68 of each trolley assembly 66 is offset from the first and second load trolleys 72 and 74 thereof and moves within the drive trolley free track 104 (FIGS. 3 and 5). The load trolleys 72 and 74 move within the load trolley free track 106 which preferably remains aligned with the common track 102 and centered along the pallet travel path throughout the production area as generally illustrated in FIG. 3. The split between the drive and load trolley free tracks 104 and 106 offsets the drive trolley 68 from the lead load trolley and permits the pallet assemblies to achieve abutting engagement through the production area. More particularly, the offset free tracks take up the spacing 114 (FIG. 3) that is maintained between the pallets throughout the delivery area 104. Accordingly, the present invention is able to maintain spacing in the delivery areas when the pallet assemblies are driven by the PF conveyor assembly to facilitate movement of the pallets through horizontal turns and vertical curves while eliminating the spacing through the production areas to provide a continuous moving platform therein. It should be appreciated that the spacing between the rear end 116 of the lead pallet assembly 44b and the front end 118 of the following pallet assembly 44a in the delivery area may be varied to achieve the desired performance of the production operation.

After the pallets are moved through the production area 16 by the friction drive assembly 32, the pallets pass through the exit transfer zone 36 (FIG. 3) which transfers he pallets into driving engagement with the PF conveyor assembly 30. More particularly, the drive trolley free track 104 is converged toward the load trolley free track 106 to reform the common free track 102 in the second delivery area 18. The power chain 94 returns to driving engagement with the drive trolley 68 at an engagement point 120 to drive the trolley through the converging track segment. Thus, the exiting pallet assembly 44e is drivably engaged by the power chain 94 and moved into the second delivery area 18 where the drive trolley 68 and load trolleys 72 and 74 are each again aligned within the common free track 102 so as to re-establish the spacing 114 between adjacent pallets.

As noted above, the friction drive assembly 32 is shown in the attached drawing to include main drives 100 as well as retarding and accelerating drives for varying the pallet speeds near the entrance and exit transfer zones 34 and 36. Retarding drives 122 prevent runaway of the pallets near the exit transfer zone 36 and ensure the desired abutment of adjacent pallets throughout the production area. Accelerator drives 124 are shown to precede the first drive wheel assembly 100 at the entrance and to follow the retarding drive 122 at the exit transfer zone 36. As noted above, the accelerator drive 124 at the entrance functions as the close-up mechanism 110. Conversely, the accelerator drive 124 at the production area exit accelerates the exiting pallet assembly 44e away from the production area 16. It should be appreciated that this accelerator drive is optional as the power chain can drivably engage the drive trolley 68 after the pallet has passed through the last retarding drive 122. If the optional accelerator drive 124 is included, it is anticipated that the accelerator drive 124 would accelerate the exiting pallet such that the drive trolley moves at a rate greater than the power chain 94. In such an arrangement, while the power chain is drivably engageable with the drive trolley at the engagement point 120, the increased velocity of the pallet assembly provided by the accelerator drive may cause the drive trolley to pass over one or more of the pusher dogs on the power chain causing a delay of the power chain engagement with the drive trolley until the exiting pallet has fully cleared the accelerator drive 124. In any event, the exiting pallet assembly 44e is driven by the power chain 94 as the pallet assembly enters the second delivery area 18.

From the above description of entrance and exit transfer zones 34 and 36, those skilled in the art should appreciate that numerous transfers between production and delivery areas may be provided as necessary to achieve the overall production requirements of the assembly line. Moreover, by including vertical curves and horizontal turns in the PF conveyor assembly 30 layout, the pallet assemblies may be moved with increased flexibility and reduced cost when compared to the conventional systems which require numerous elevators, turn tables, transfer tables, and the like. For example, with reference to second delivery area 18 shown in FIG. 1, the PF conveyor assembly 30 can transfer pallet assemblies from the first production area 16 on the lower level of the production operation, onto the second building level, into alignment with the second production area 20, and back to the first building level without requiring the transfer table, turn table, and elevator necessary for the conventional layout described in the background of this application. Specifically, as generally illustrated in FIG. 1, the PF conveyor assembly 30 can include a pair of 180° horizontal turns 130, two ninety degree (90°) horizontal turns 132, a sloping vertical ascent 134, and a sloping vertical descent 136.

Figure 9:
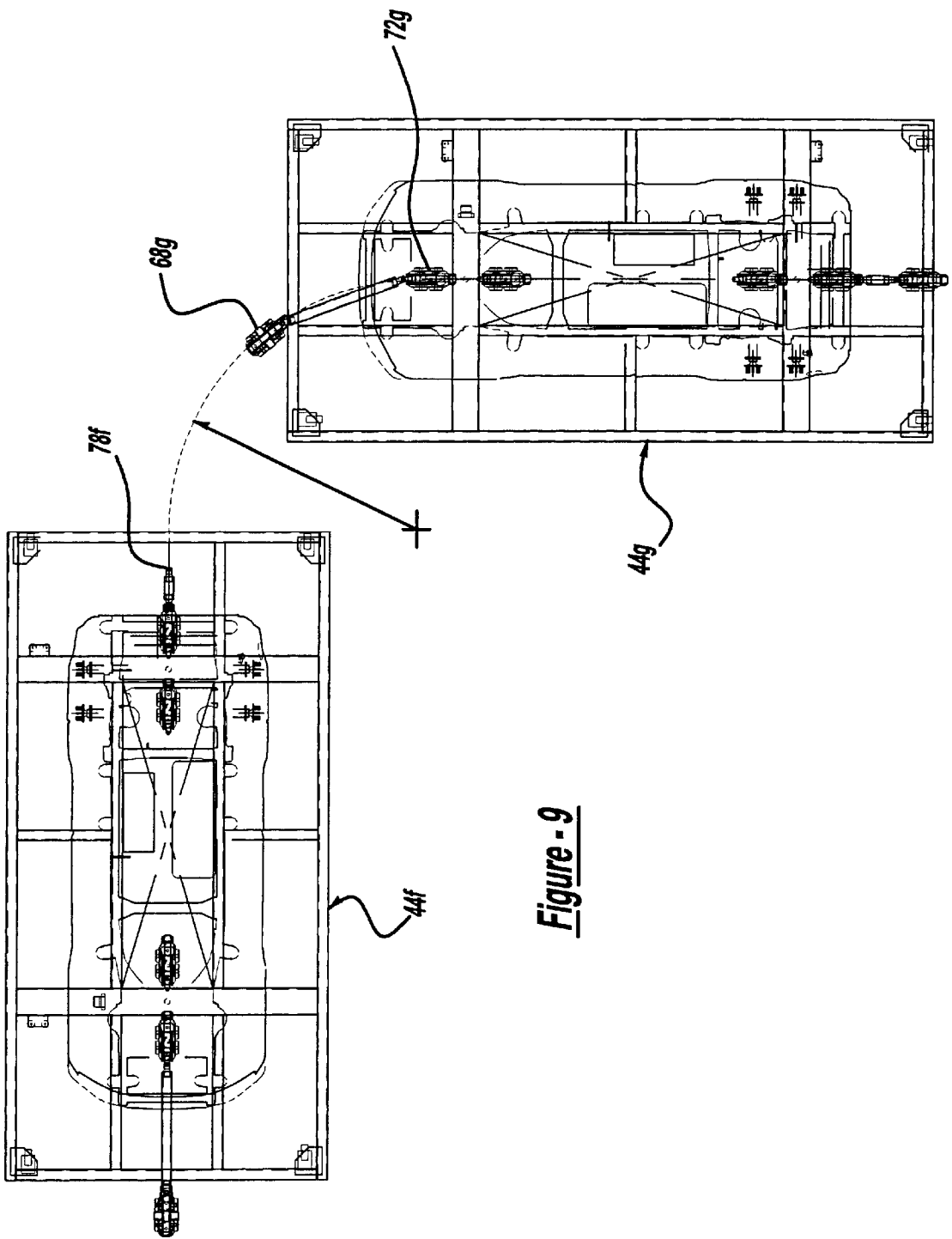
FIG. 9 is a top plan view of a pair of pallet assemblies entering a horizontal curve while being driven by the PF conveyor assembly.

A representative vertical curve and horizontal turn for the PF conveyor assembly 30 are illustrated in FIGS. 8 and 9. FIG. 8 shows the sloping vertical ascent 134 and an entrance vertical curve 138 in the second delivery area 18. The pallet assembly 44 is moved into the sloping vertical ascent 134 via driving engagement between the power chain and the drive trolley 68. In the illustrated embodiment, the length of the pallet 48 between its front end 140 and rear end 142 is twenty feet and the spacing between the centers of the front and rear load trolleys 72 and 74 is approximately ten (10) feet. This configuration permits the entrance vertical curve 138 to extend along a twenty degree (20°) arc 137 at a radius of twenty-five (25) feet. It should be appreciated that a variety of modifications may be made to the components of the pallet conveyor system in order to achieve a desired radius of curvature and rate of ascent. For example, the stands 80 on the front and rear load trolleys may be lengthened to permit a lesser radius or greater degree of curvature. However, lengthening of the stands will raise the center of gravity of the pallet assembly thereby decreasing its stability and requiring greater overhead clearance. It should be appreciated that the exit vertical curve from sloping vertical ascents such as 134, as well as the entrance vertical curve on sloping vertical descents such as 136 (FIG. 1), will have a similar configuration to that described above but with a convex curvature. In these situations, the clearance of particular interest is the clearance of the center of the pallet rather than the front and rear ends thereof.

A representative horizontal turn is shown in FIG. 9 wherein adjacent pallet assemblies 44f and 44g are conveyed around a 90° turn. The spacing between the adjacent pallet assemblies is maintained by the PF conveyor assembly and, more particularly, by the separation between the drive trolley 68g and first load trolley 72g of the pallet assembly 44g as well as the spacing of the pusher dogs on the power chain and the position of the accumulating trolley 78f. This spacing prevents collision between the pallet assemblies as they move through the horizontal curve.

In addition to the above described benefits attendant to the present invention, those skilled in the art will appreciate that the PF conveyor assembly 30 of the present invention permits accurate indexing of adjacent pallet assemblies throughout the delivery areas as well as efficient banking and accumulation of the pallet assemblies. Numerous mechanisms for indexing and accumulating trolleys and their associate payloads using inverted power and free conveyors are generally known in the art.

Figure 10:
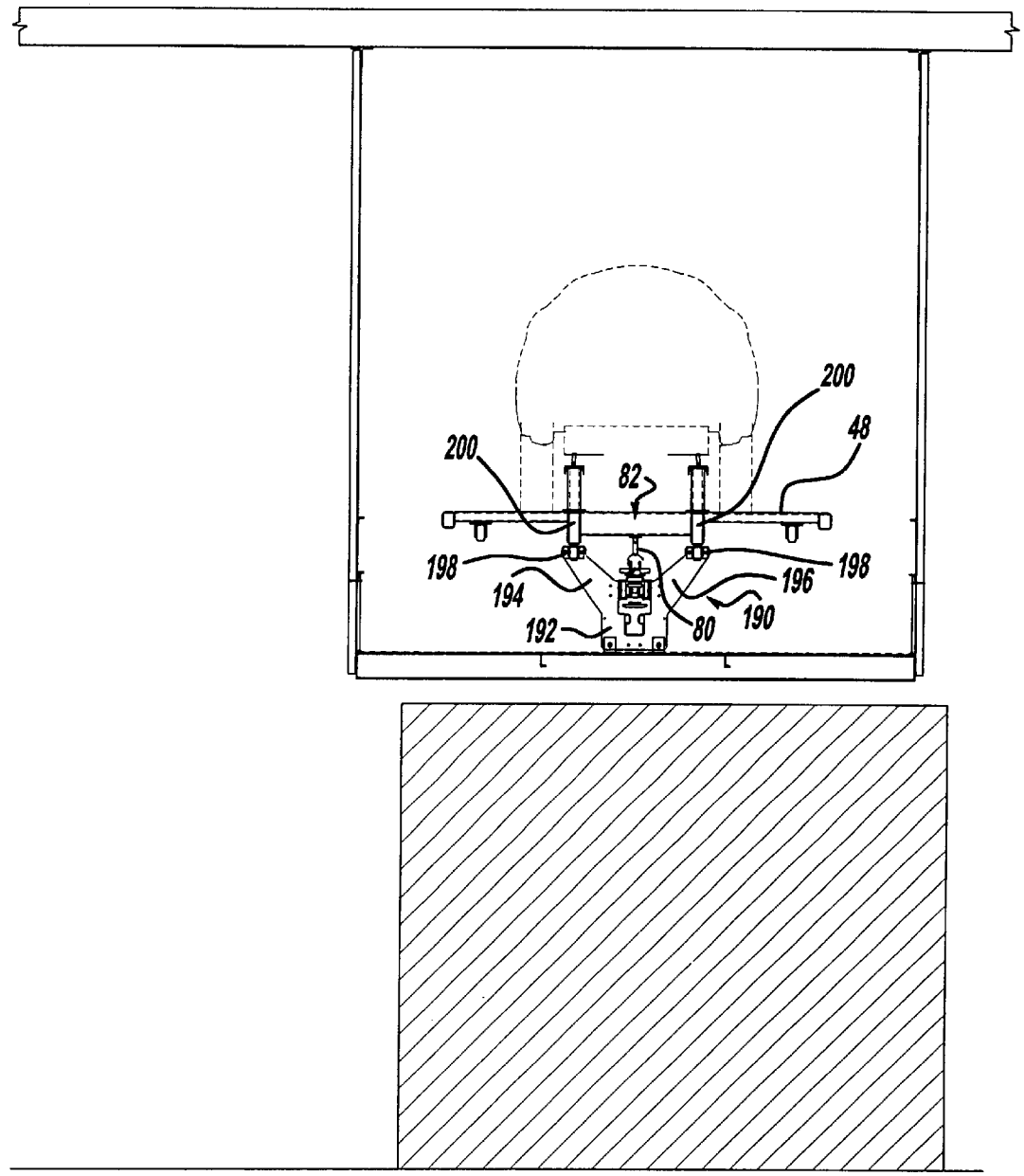
FIG. 10 is a cross-sectional view similar to that shown in FIG. 2 and illustrating an alternative configuration for the pallet support stand.

The stability of the pallet assembly relative to the PF conveyor assembly 30 may be enhanced through the use of a yoke 190 (FIG. 10). The yoke 190 is coupled to the PF conveyor track base 192 and includes ascending arms 194 and 196 with rollers 198 engagable with the support frame 82. More particularly, the support frame 82 includes a first set of guide rails 200 that are engagable with the load bearing rollers 198. The separated guide rails widen the support contact between the pallet 48 and PF conveyor assembly thereby stabilizing the pallet assembly without the need for additional structural components coupled to the trolleys or the pallet.

Figure 11:
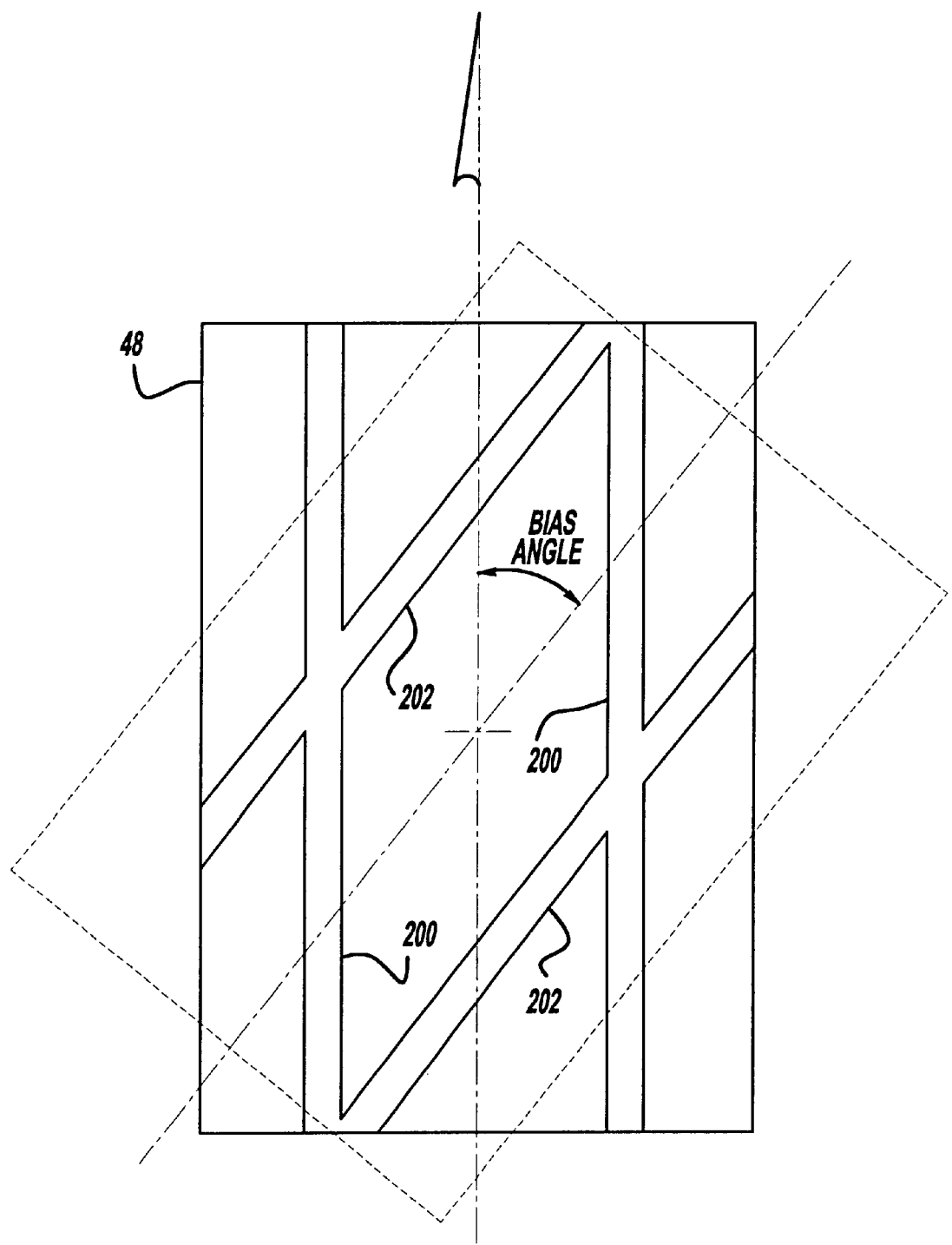
FIG. 11 is a bottom plan view of the pallet showing multiple sets of guide rails in accordance with an alternative configuration of the present invention.

A further advantage of the yoke and guide rails is that, as illustrated in the bottom plan view of the pallet shown in FIG. 11, additional sets of guide rails 202 may be provided on the underside of the pallet at an angle relative to the first set of guide rails 200. The connection of the pallet assembly to the load trolley stands 80 (FIG. 10) may then include a pivot joint to permit rotation of the pallet in a horizontal plane. By this configuration, the pallet may be reoriented or biased relative to the travel path such that the second set of guide rails 202 rollingly engage the rollers 198. The biasing of the pallet assembly relative to the travel path allows the pallet assembly to be positioned in virtually any orientation relative to the travel path and thereby facilitate the performance of a production task. For example, a robotic production task such as windshield installation may be more efficiently performed by placing the pallet assembly in a predetermined bias orientation. The biasing of the pallet assemblies also permits more effective accumulation in bias banks. It should be appreciated that any number of sets of guide rails may be provided on the underside of the pallet to accommodate virtually any bias angle. A bearing plate may also be fixed to the pallet in lieu of multiple sets of guide rails.

Figure 12:
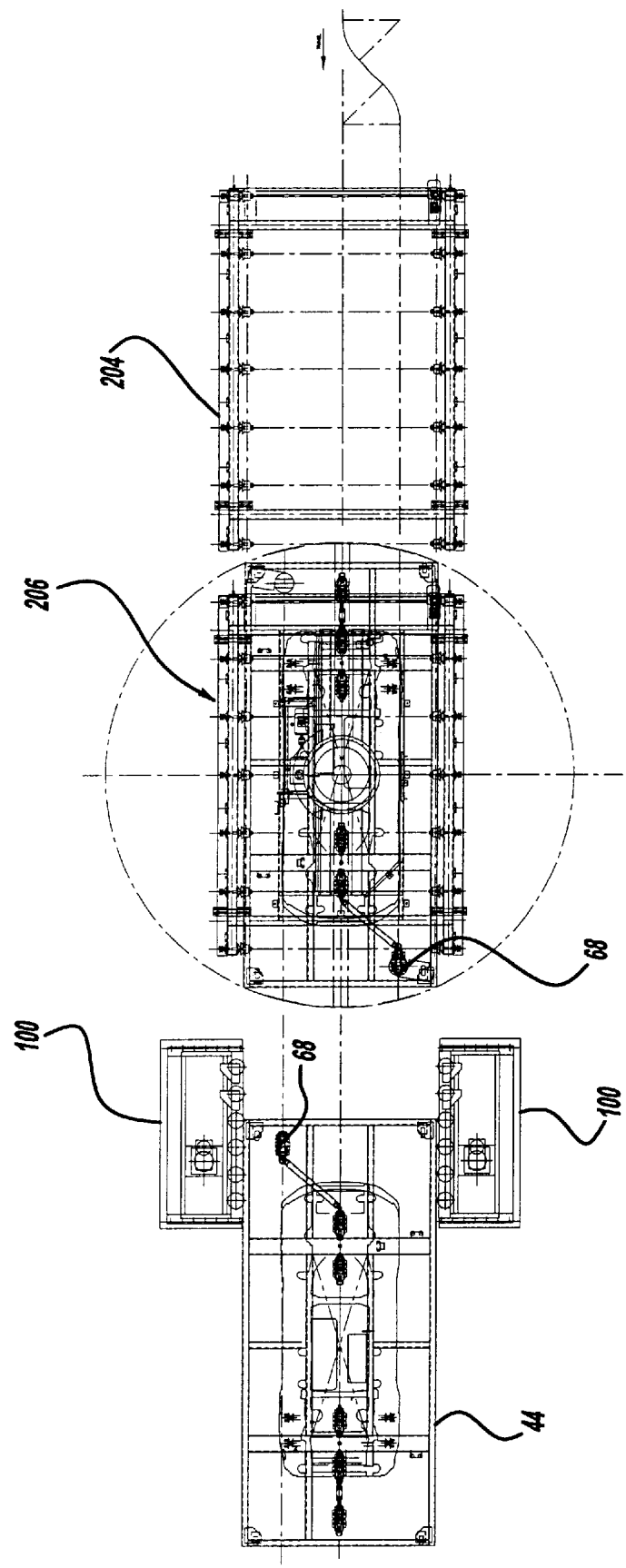
FIG. 12 is a top plan view of an entrance transfer zone with drive mechanisms to reorient the pallet assembly prior to engagement with the friction drive assembly.

A variety of modifications may be made to the embodiment described herein in order to obtain additional benefits and performance enhancements and without departing from the scope of the invention defined by the appended claims. For example, if it is desired to move the workpiece front first through a first production area and rear first through another production area, a power roll table 204 and turn table 206 may be positioned prior to the drive wheel assemblies 100 as shown in FIG. 12. In this arrangement, the pallet assembly is transferred from driving engagement with the PF conveyor to the roll table 204. The roll table moves the pallet assembly to the turn table 206 where the pallet assembly, drive and load trolleys, and sections of the drive trolley and load trolley free tracks are rotated one-hundred eight degrees (180°). The transfer table then passes the reoriented pallet assembly to driving engagement with the drive wheel assemblies 100. Accelerator drives 124, such as those shown in FIG. 3, may be positioned to precede the drive wheel assemblies 100. Another set of transfer and roll tables would be positioned at the exit transfer zone to reorient the pallet assembly in a front first position.

From the above, those skilled in the art will appreciate that the present invention provides a variety of cost, performance, and operational benefits over conventional systems. These benefits result in part from the elimination of complex and costly elevators, transfer tables, and turn tables as well as the drive mechanisms, controllers, and other components associated therewith. Cost savings are also realized from repair and maintenance savings attendant to a reduction in the number and complexity of conveyor components.

The present invention is also directed to a method of moving a plurality of pallet assemblies through a production operation. With reference to FIG. 3 and 4, the method includes the steps of maintaining the plurality of pallet assemblies spaced from one another in the delivery area and abutting adjacent pallet assemblies in the production area. Further features of the method include moving the drive trolley 68 and the load trolleys 72 and 74 in the common free track 102 when the pallet assembly is in the delivery area and moving the drive trolley in the drive trolley free track 104 and the load trolleys into the load trolley free track 106 before the pallet assembly enters the production area. The method also relates to the exit transfer zone 36 described above and includes the step of moving the drive trolley 68 from the drive trolley free track 104 and into the common free track 102 as each pallet assembly moves out of the production area. The aforementioned method steps will be readily understood by those skilled in the art in view of the description provided above with reference to FIGS. 1–12.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A conveyor driven production operation comprising:
   a plurality of pallets including a first pallet and a second pallet;
   a first area;
   a delivery area wherein each pallet is moved to or from the first area;
   a first conveyor assembly drivably engagable with each pallet when each pallet is in the first area to drive the first and second pallets through the first area, said first conveyor assembly being out of driving engagement with each pallet when the first and second pallets are in said delivery area;
   a power and free conveyor assembly drivably engaging the first and second pallets when the first and second pallets are in the delivery area to drive the first and second pallets through the delivery area, said power and free conveyor assembly being out of driving engagement with the first and second pallets when the first and second pallets are in said first area, said power and free conveyor assembly further including a free track extending through said first area.

2. The conveyor driven production operation of claim 1 wherein said free track includes a drive trolley free track and a load trolley free track each extending through said first area.

3. The conveyor driven production operation of claim 2 wherein said drive trolley free track is offset from and parallel to said load trolley track in said first area.

4. The conveyor driven production operation of claim 2 wherein said power and free conveyor assembly further includes first and second trolley assemblies each having a drive trolley and a load trolley, wherein said first trolley assembly is coupled to the first pallet and said second trolley assembly is coupled to a second pallet, and wherein said drive trolley is disposed within said drive trolley free track and said load trolley is disposed within said load trolley free track when said pallets are in said first area.

5. The conveyor driven production operation of claim 1 wherein said power and free conveyor assembly further includes a power track assembly having a channel and a power chain movably disposed within said channel, wherein said channel extends through said delivery area, and wherein said channel does not extend into said first area.

6. The conveyor driven production operation of claim 5 wherein said power and free conveyor assembly further includes first and second trolley assemblies each having a drive trolley and a load trolley, wherein said first trolley assembly is coupled to the first pallet and said second trolley assembly is coupled to the second pallet, and wherein said channel is positioned to place the power chain in driving engagement with the drive trolley of each of said first and second trolley assemblies when the drive trolleys are in the delivery area.

7. The conveyor driven production operation of claim 1 wherein said power and free conveyor assembly drives said first and second pallets through a vertical curve in said delivery area.

8. The conveyor driven production operation of claim 1 wherein said power and free conveyor assembly drives said first and second pallets through a horizontal curve in said delivery area.

9. The conveyor driven production operation of claim 1 wherein said second pallet follows said first pallet through said first area and said delivery area, each of said first and second pallets having a front end and a rear end.

10. The conveyor driven production operation of claim 9 wherein said front end of said second pallet abuts said rear end of said first pallet when said first and second pallets are in said first area, said front end of said second pallet being spaced from said rear end of said first pallet when said first and second pallets are in said delivery area.

11. A conveyor driven production operation comprising:
   a pallet;
   a first production area having an entrance, an exit, and defining a pallet travel path between said entrance and exit;
   a first delivery area located before or after the first production area in relation to the travel path;
   a first transfer zone between said first production area and said first delivery area;
   a first conveyor assembly drivably engaging the pallet when the pallet is in said first production area, said first conveyor assembly being out of driving engagement with said pallet when said pallet is in said first delivery area; and
   a power and free conveyor assembly drivably engaging said pallet when said pallet is in said first delivery area, said power and free conveyor assembly including a power track assembly, a free track assembly, and a trolley assembly fixed to the pallet, said free track assembly extending through said first production area, said first delivery area, and said first transfer zone.

12. The conveyor driven production operation of claim 11 wherein said free track assembly includes a common free track in said first delivery area and a drive trolley free track and a load trolley free track in said first production area, said drive and load trolley free tracks being separated from one another in said first production area.

13. The conveyor driven production operation of claim 12 wherein said load trolley free track is centered on said travel path and said drive trolley free track is generally parallel to said load trolley free track.

14. The conveyor driven production operation of claim 13 wherein said trolley assembly includes a drive trolley coupled to said pallet, a load trolley coupled to said pallet, and a tow bar pivotally coupled to said drive trolley and said load trolley to drivably connect said load trolley to said drive trolley.

15. The conveyor driven production operation of claim 12 wherein said trolley assembly includes a drive trolley coupled to said pallet and a load trolley coupled to said pallet, wherein said drive trolley and said load trolley move within said common free track when said pallet is in said first delivery area, and wherein said load trolley moves within said load trolley free track and said drive trolley moves within said drive trolley free track when said pallet is in said first production area.

16. The conveyor driven production operation of claim 15 wherein said first transfer zone is positioned between said first delivery area and the entrance to said first production area.

17. The conveyor driven production operation of claim 16 wherein said first transfer zone includes a switch, wherein drive trolley free track diverges from said load trolley free track, and wherein said switch directs said drive trolley from said common free track to said drive trolley free track.

18. The conveyor driven production operation of claim 17 wherein said power and free conveyor assembly drivably engages said drive trolley when said drive trolley is within said drive trolley free track.

19. The conveyor driven production operation of claim 17 wherein said drive trolley free track includes a first portion diverging from said load trolley free track and a second portion parallel to said load trolley free track, wherein said power and free conveyor assembly includes a power chain drivably engaging said drive trolley when said drive trolley is in said first portion, and wherein said power chain does not drivably engage said drive trolley when said drive trolley is in said second portion.

20. The conveyor driven production operation of claim 15 wherein said first transfer zone is positioned between said first delivery area and the exit from said first production area.

21. The conveyor driven production operation of claim 20 wherein said first transfer zone includes a switch, wherein drive trolley free track converges toward said load trolley free track, and wherein said switch directs said drive trolley from said drive trolley free track to said common free track.

22. The conveyor driven production operation of claim 20 wherein said drive trolley free track includes a first portion diverging from said load trolley free track and a second portion parallel to said load trolley free track, wherein said power and free conveyor assembly includes a power chain drivably engaging said drive trolley when said drive trolley is in said first portion, and wherein said power chain does not drivably engage said drive trolley when said drive trolley is in said second portion.

23. The conveyor driven production operation of claim 15 further including a second delivery area and a second transfer zone and wherein said first delivery area precedes said first production area, said second delivery area follows said first production area, said first transfer zone is located between said first delivery area and said first production area, and said second transfer zone is located between said first production area and said second delivery area.

24. The conveyor driven production operation of claim 23 wherein said first transfer zone includes an entrance switch, said drive trolley free track diverges from said load trolley free track, and said entrance switch directs said drive trolley from said common free track to said drive trolley free track and wherein said second transfer zone includes an exit switch, said drive trolley free track converges toward said load trolley free track, and said exit switch directs said drive trolley from said drive trolley free track to said common free track.

25. The conveyor driven production operation of claim 15 wherein said power track assembly includes a channel and a chain movable within said channel, said power track being vertically aligned with said common free track in said delivery area and drivably engagable with the drive trolley when the pallet is in the first delivery area.

26. The conveyor driven production operation of claim 25 wherein said load trolley free track is axially aligned with said common free track.

27. The conveyor driven production operation of claim 25 wherein said channel moves out of vertical alignment with said drive trolley free track after said switch to move said chain out of driving engagement with said drive trolley.

28. The conveyor driven production operation of claim 25 wherein said channel moves into vertical alignment with said common free track in said first delivery area.

29. The conveyor driven production operation of claim 15 further including a second delivery area following the first production area relative to the travel path and a second transfer zone between said first production area and said second delivery area, wherein said first delivery area precedes said first production area, wherein said power track assembly includes a first channel vertically aligned with the common free track in the first delivery area and a second channel vertically aligned with the common free track in the second delivery area, wherein said load trolley free track is axially aligned with said first and second common free tracks.

30. The conveyor driven production operation of claim 11 wherein said first delivery area includes a vertical curve.

31. The conveyor driven production operation of claim 11 wherein said first delivery area includes a horizontal curve.

32. The conveyor driven production operation of claim 11 wherein said pallet does not drivably engage either of said first conveyor assembly and said power and free conveyor assembly at a point in the transfer zone.

33. A conveyor driven production operation comprising:
a plurality of pallets including a first pallet and a second pallet;
a first area;
a delivery area wherein each pallet is moved to or from the first area;
a first conveyor assembly drivably engagable with each pallet when each pallet is in the first area to drive the first and second pallets through the first area, said first conveyor assembly being out of driving engagement with each pallet when the first and second pallets are in said delivery area;
a power and free conveyor assembly drivably engaging the first and second pallets when the first and second pallets are in the delivery area to drive the first and second pallets through the delivery area, said power and free conveyor assembly being out of driving engagement with the first and second pallets when the first and second pallet are in said first area, and wherein said second pallet assembly abuts said first pallet assembly in said first area and said second pallet is spaced from said first pallet when said first and second pallets are in said delivery area.

34. The conveyor driven production operation of claim 33 wherein said power and free conveyor assembly includes a free track extending through said first area.

35. The conveyor driven production operation of claim 34 wherein said free track includes a drive trolley free track and a load trolley free track each extending through said first area.

36. The conveyor driven production operation of claim 35 wherein said drive trolley free track is offset from and parallel to said load trolley free track in said first area.

37. The conveyor driven production operation of claim 36 wherein said power and free conveyor assembly further includes first and second trolley assemblies each having a drive trolley and a load trolley, wherein said first trolley assembly is coupled to the first pallet and said second trolley assembly is coupled to a second pallet, and wherein said drive trolley is disposed within said drive trolley free track and said load trolley is disposed within said load trolley free track when said pallets are in said first area.

38. The conveyor driven production operation of claim 34 wherein said power and free conveyor assembly further includes a power track assembly having a channel and a power chain movably disposed within said channel, wherein said channel extends through said delivery area, and wherein said channel does not extend into said first area.

39. A power and free conveyor assembly for use in a conveyor driven production operation that includes a pallet, a first production area having an entrance, an exit, and defining a pallet travel path between the entrance and exit, the production operation further includes a first delivery area located before or after the first production area in relation to the travel path, a first transfer zone between the first production area and the first delivery area, and a first conveyor assembly for drivably engaging the pallet when the pallet is in the first production area, the first conveyor assembly being out of driving engagement with the pallet when said pallet is in the first delivery area, said power and free conveyor assembly comprising:
a free track assembly having a common free track and a transfer zone where the common free track splits into a drive trolley free track and a load trolley free track, said drive and load trolley free tracks being separated from and generally parallel to one another; and
a power track assembly drivably aligned with said common free track and a portion of said drive trolley free track, said power track includes a disengaging point where said power track moves out of driving alignment with said drive trolley free track.

40. The power and free conveyor assembly of claim 39 further includes a trolley assembly adapted to be fixed to the pallet, said trolley assembly including a drive trolley, a load trolley adapted to be coupled to the pallet, and a tow bar pivotally coupled to said drive trolley and said load trolley to drivably connect said load trolley to said drive trolley.

41. The power and free conveyor assembly of claim 40 wherein said drive trolley and said load trolley each move within said common free track in the first delivery area and wherein said load trolley moves within said load trolley free track and said drive trolley moves within said drive trolley free track in said transfer zone.

42. The power and free conveyor assembly of claim 41 wherein said transfer zone includes a switch, wherein the drive trolley free track diverges from said load trolley free track, and wherein said switch directs said drive trolley from said common free track to said drive trolley free track.

43. A method of moving a plurality of pallets through a production operation, the production operation including a first area and a delivery area wherein each pallet is moved to or from the first area, said production operation further including a first drive assembly and a power and free conveyor assembly, said power and free conveyor assembly including a drive trolley, a load trolley coupled to move with each pallet, a power track, and a free track that includes a common free track in the delivery area and a drive trolley free track offset and generally parallel to a load trolley free track in the first area, said method comprising the steps of:
maintaining said plurality of pallets spaced from one another in said delivery area while driving the pallets through the delivery area with the power and free conveyor assembly;
moving the drive trolley and the load trolley in the common free track when each pallet is in the delivery area;
moving the drive trolley into the drive trolley free track and the load trolley into said load trolley free track before each pallet enters the first area; and
abutting adjacent pallets in said first area and driving the pallets through the first area with the first drive assembly.

44. The method of claim 43 further including moving the drive trolley from the drive trolley free track and into the common free track as each pallet moves out of the first area.

* * * * *

UNITED STATES PATENT AND TRADEMARK OFFICE
CERTIFICATE OF CORRECTION

PATENT NO. : 6,494,304 B1
DATED : December 17, 2002
INVENTOR(S) : John Jaynes et al.

It is certified that error appears in the above-identified patent and that said Letters Patent is hereby corrected as shown below:

<u>Column 9,</u>
Line 10, "he" should be -- the --.

<u>Column 15,</u>
Lines 40 and 41, delete "assembly".

Signed and Sealed this

Nineteenth Day of August, 2003

JAMES E. ROGAN
*Director of the United States Patent and Trademark Office*